Sept. 1, 1931. C. H. DITTRICK ET AL 1,821,008
DRY CELL BATTERY
Filed Jan. 13, 1927 2 Sheets-Sheet 1
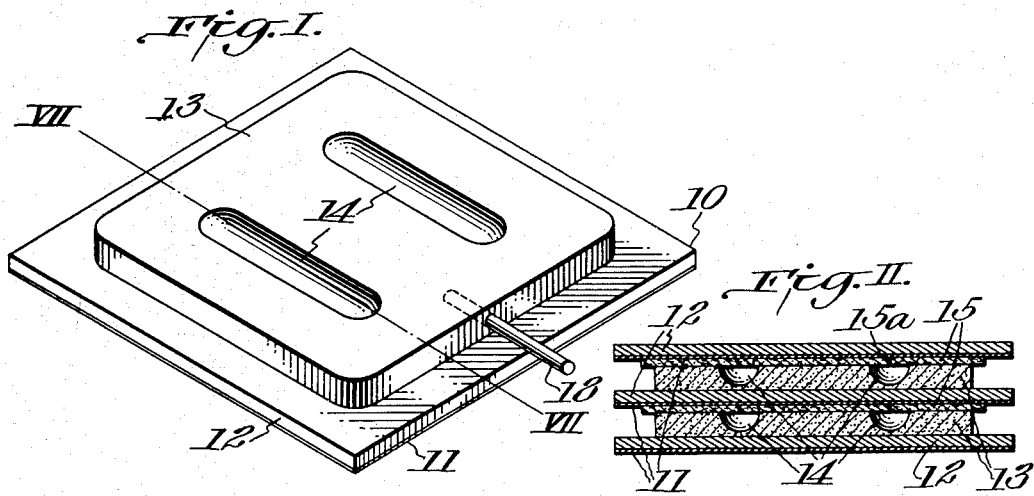
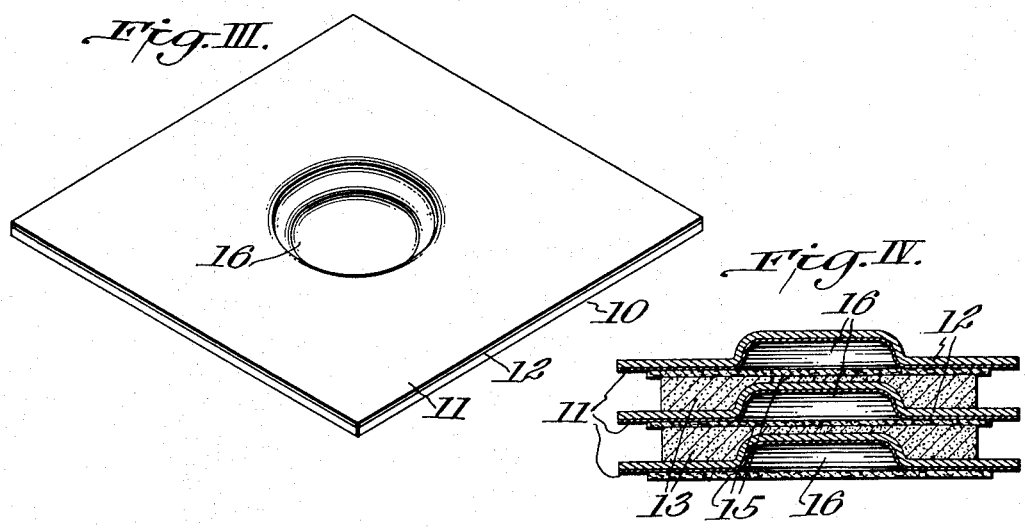
Inventors:
Clarence H. Dittrick,
Newcomb K. Chaney,
By Bynes Townsend & Brickenstein,
Attorneys.

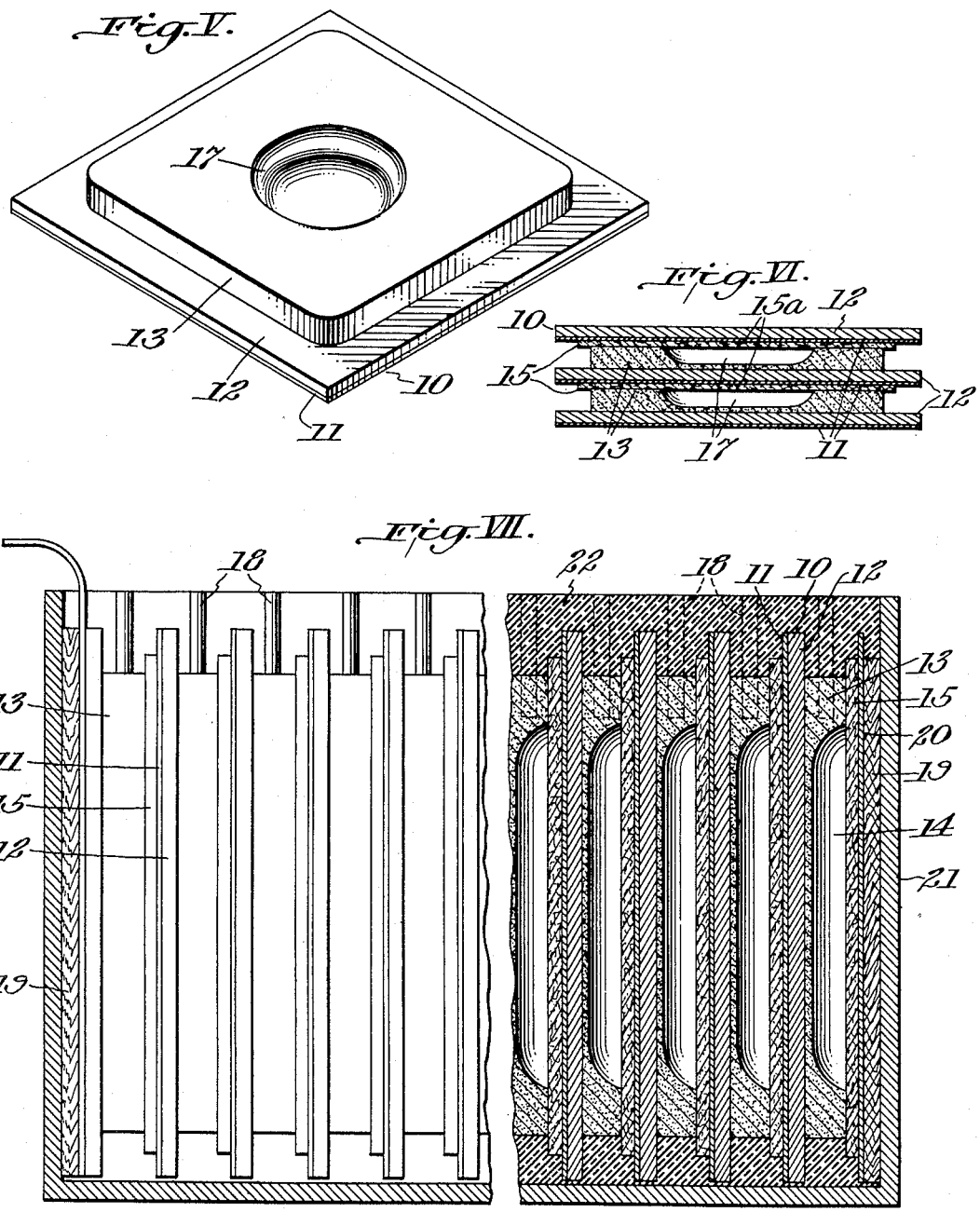

Patented Sept. 1, 1931

1,821,008

UNITED STATES PATENT OFFICE

CLARENCE H. DITTRICK AND NEWCOMB K. CHANEY, OF LAKEWOOD, OHIO, ASSIGNORS TO NATIONAL CARBON COMPANY, INC., A CORPORATION OF NEW YORK

DRY CELL BATTERY

Application filed January 13, 1927. Serial No. 160,961.

This invention relates to dry cells and more particularly to dry cells of the flat type which are adapted to be assembled into batteries such as are used for various purposes, for example as B batteries in radio communication.

The chemical reactions which take place in a dry cell cause the liberation of gas. The liberated gas tends to cause the paste electrolyte (rendered more fluid by hydrolysis) to be forced away from the vicinity of the anode into other parts of the cell. In a battery of flat type cells such paste is forced to the peripheral parts of the cells and tends to break down the insulating material and cause intercell communication and short-circuiting of the battery. It has been customary in the manufacture of dry cells to provide a space or chamber external with respect to the active parts of the cell for retaining that portion of the paste which is forced away from the normal position between the anode and the pulpboard spacer. In the usual form of cylindrical dry cell this has been brought about by providing an air space or chamber at the top of the cell between the mix and the seal. In a battery of flat type cells a similar practice is possible but requires the use of a special seal-supporting structure and additional manufacturing operations in the preparation and insertion of the seal-supporting structure in the battery which materially increase the labor and expense incident to its manufacture.

The present invention has for an object the elimination of the expensive seal-supporting structure and of the manipulations incident to its use. A further object is to avoid the passage of liquid paste to peripheral portions of the cell where the hazards of inter-cell communication and seal breakdown are greatest. These objects are brought about by forming an internal electrolyte- or paste-expansion chamber so arranged as to receive and store such excess of liquefied paste as may be formed. Preferably this is done by forming a plurality of parallel troughlike depressions in the depolarizing mix cake so that on assembling the zinc electrode, the mix cake and the bibulous spacer which is customarily placed between the zinc electrode and the mix cake, narrow cavities are defined between such spacer and the depressed portions of the mix cake. In addition to the mechanical advantages obtainable by manufacturing flat type batteries with this construction, the hydrolyzed paste is retained in closer proximity to the zinc electrode than is the case with the exterior expansion chamber or air space and its redistribution is rendered more effective. Also, by locating the paste expansion chamber in the mix cake, electrolyte which has been extracted by the paste hydrolysis will become reabsorbed by the mix. At the same time the mix will tend to act as a filter for the gases and to prevent the carrying away with them of any excess moisture.

The invention will be described with more particularity in connection with the accompanying drawings, in which, Fig. I is a perspective view of an individual unit comprising a flat electrode plate and a mix cake having a plurality of shallow troughlike depressions stamped in one face thereof.

Fig. II is a cross section of a portion of a cell assembly embodying units such as shown in Fig. I.

Fig. III is a perspective view of a modification of the invention in which a portion of the zinc plate electrode is depressed to form a paste cavity.

Fig. IV is a cross section of a portion of a cell assembly embodying electrodes of the type shown in Fig. III.

Fig. V is a perspective view of a third modification of the invention in which the mix cake is shown as having a single depression of circular contour instead of a plurality of shallow troughlike depressions.

Fig. VI is a cross section of a portion of a cell assembly embodying the modification shown in Fig. V, and Fig. VII is a part sectional and part side elevational view of a complete assembly of cells of the form shown in Figs. I and II, the part shown in section being taken on line VII—VII of Fig. I.

Figures I and II illustrate a preferred form of the invention in which reference numeral 10 designates a duplex electrode of the type shown and described in U. S. patent to Rider and Huntley No. 1,508,987, and comprising a zinc plate 11 and a coating of a conductive carbon-containing material 12. Superimposed upon the coated side of the electrode 10 is a depolarizing mix cake 13 shown in Figs. I and II as provided with two troughlike depressions 14. In assembling the various cell elements as shown in Fig. II a spacer 15 of suitable bibulous material, for example pulpboard, is next laid upon the mix cake and then a second duplex electrode is placed upon the spacer with the metallic side in contact therewith. The respective elements are applied in this order until a battery of the desired number of cells is built up. The spacer 15 is preferably provided with a coating of paste electrolyte on the side in contact with the zinc electrode, and additional electrolytic salts may be, and preferably are, incorporated in the mix in known manner. In order to permit the paste to pass into the depressions or cavities 14 one or more openings 15a are provided in the spacer 15. These openings preferably should take the form of slits because it is found that when such slits are provided they are distorted sufficiently under pressure to permit passage of paste from points adjacent the zinc surface to the expansion chamber but upon equalization of the pressure by flow of paste into the expansion chamber the slits close, thereby preventing the migration of any mix particles to the zinc surface and shutting off any paths of undue low resistance. Preferably there should be two or more slits opposite each expansion chamber or air space and at right angles to it. A very satisfactory valve action has been created by forming two intersecting slits at right angles.

In Figs. I and VII a suitable porous venting means 18 is shown as embedded at one end in the mix cake at a point approximately equally distant between the depressions 14. While the venting means per se forms no part of the present invention and is more particularly described and claimed in a copending application of Paul M. Buhrer, Serial No. 167,254, filed Feb. 10, 1927, from the standpoint of proper operation of the paste chambers and to insure flow of paste and gases thereto such venting means should be provided, and preferably is located at a point equidistant from the air spaces or chambers and as close as possible to them.

In the modification shown in Figs. III and IV a depression 16 is formed in the duplex electrode by a suitable cupping operation and the mix cake is moulded over the convex coated surface of such electrode.

Figs. V and VI illustrate a modification in which the depolarizing mix cake is provided with a centrally disposed depression 17 of circular contour.

Fig. VII shows an assembly of cell elements such as illustrated in Figs. I and II. While the method of assembly does not constitute part of the present invention, according to a preferred method and the one which was employed in assembling the battery shown in Fig. VII, the battery is built up before it is inserted in the battery box by stacking in periodic succession the elements of the respective cells,—duplex electrode, mix cake, pulpboard spacer,—until a battery of the desired number of cells is obtained. The battery shown in Fig. VII is also provided with end boards 19 of wood or other suitable insulating material and also the end electrode, which in assembling the battery is at the bottom of the stack in contact with the end board, is shown as a plain uncoated metal plate 20. When the assembly is completed the battery elements are secured together with a binding of tape or similar means, not shown, which is so applied as to hold the assembly under pressure. The method of assembling the battery is described in more detail and is claimed in the copending application of Elmer J. Strohl and Edward C. Smith, Serial No. 196,907 filed June 6, 1927. The battery assembly, either as thus formed or after a preliminary dipping operation having for its object the formation of a thin coating of sealing plastic over the whole assembly, is inserted in the battery box 21. The vent-forming inserts 18 are then applied and finally the space between the peripheral portions of the sealing units and the battery box is filled with a plastic sealing material 22.

We claim:

1. A dry cell of the flat type comprising opposed zinc and carbon electrodes, depolarizer mix therebetween, a bibulous spacer between the mix and the zinc electrode, a depression in the mix cake defining an air space adjacent the spacer and said spacer being provided with an opening opposite the air space.

2. A battery comprising a plurality of flat electrode elements arranged in spaced relation, depolarizer mix in the inter-electrode spaces and spaced from certain of said electrodes by bibulous spacers, cavities in the mix adjacent the spacers, and means permitting the passage of electrolyte paste through the spacers into the cavities.

3. A battery comprising a plurality of flat electrode elements arranged in spaced relation, depolarizer mix in the inter-electrode spaces and spaced from certain of said electrodes by bibulous spacers, cavities in the mix adjacent the spacers and slit valves in the spacers opposite said cavities.

4. A dry cell battery consisting of a plurality of flat type dry cells connected in series, each of said cells comprising a zinc electrode, a carbon electrode, depolarizing mix between said electrodes, an electrolyte, and a bibulous spacer between the mix and the zinc electrode, said depolarizing mix having a cavity therein providing a chamber, said chamber being located a substantial distance within the peripheries of said electrodes and mix, and being adapted to receive and confine expanding electrolyte to prevent the passage of such electrolyte to peripheral portions of the cell.

In testimony whereof, we affix our signatures.

CLARENCE H. DITTRICK.
NEWCOMB K. CHANEY.